Dec. 30, 1930.  F. J. LEATHER  1,786,662
HOOD FOR AUTOMOBILES AND OTHER VEHICLES
Filed March 8, 1928   2 Sheets-Sheet 1
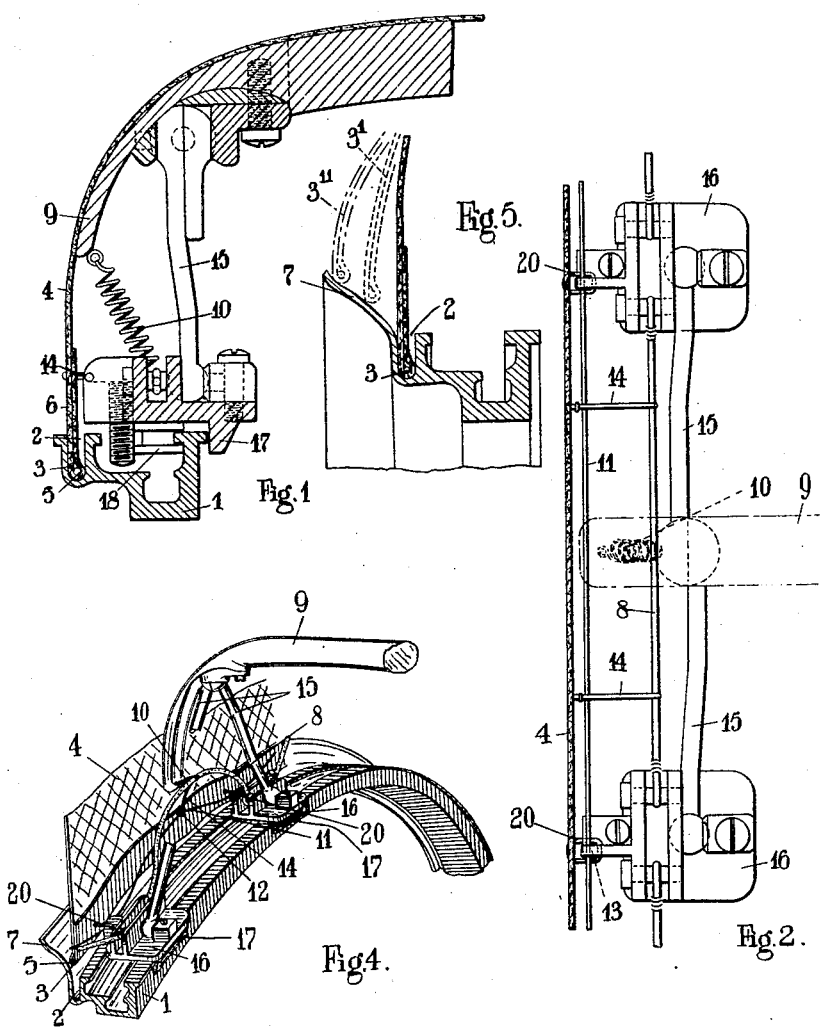
F. J. Leather
INVENTOR
By: Marks & Clark
ATTYS.

Dec. 30, 1930.  F. J. LEATHER  1,786,662
HOOD FOR AUTOMOBILES AND OTHER VEHICLES

Filed March 8, 1928  2 Sheets-Sheet 2

F. J. Leather
INVENTOR

By Marko & Clark
ATTYS.

Patented Dec. 30, 1930

1,786,662

UNITED STATES PATENT OFFICE

FELIX JOHN LEATHER, OF LONDON, ENGLAND

HOOD FOR AUTOMOBILES AND OTHER VEHICLES

Application filed March 8, 1928, Serial No. 260,205, and in Great Britain April 29, 1927.

This invention relates to hoods for automobiles and other vehicles of the kind in which cant rails are secured to the body of the vehicle and extend from the front to the rear thereof, a plurality of hood sticks for supporting a flexible covering being arranged to engage the cant rails whereby they will be supported when the hood is raised and endless flexible members being connected to the hood sticks for use in raising and lowering the hood, and particularly to the construction of hood of this kind forming the subject-matter of British specifications Nos. 263524, 264402, 28877/1925 and 15813/1926.

In the practical development of hood constructions of this kind it has been found desirable to include certain features forming the subject-matter of the present application.

These features are broadly concerned with assisting the engagement of the edge of the material of the hood in grooves or channels formed in or associated with the cant rails.

One feature of the invention consists in forming or providing the flexible hood material with substantially non-extensible edges.

Thus, in accordance with the invention, the edges of the hood material, that is to say the portions thereof extending parallel with the sides of the body, may be associated with substantially non-extensible wires or cables.

Conveniently, in accordance with the invention, a light steel cable, such as is, for instance, employed in Bowden brake mechanism, is stitched or otherwise secured to the hood material and preferably in a manner similar to that in which piping is frequently secured thereto.

The ends of the wire, as will be understood, will be connected at one end to some convenient portion of the body while the opposite end of the wire cable is secured to the peak or flap of the hood.

This member is so arranged that in drawing forward the hood so as to cover the vehicle the member in question will force the edge of the hood into the channel which the said edge is designed to enter and hold the said edge there.

A further feature of the invention comprises the employment of semi-flexible members for connecting together the shoes, such semi-flexible members being sufficiently flexible to allow the shoes to be drawn together in closing the hood and sufficiently rigid to form bows or loops adapted to force the edges of the hood material out of the channels in the cant rails during the operation of lowering the hood.

Another feature of the invention consists in the employment of a substantially non-extensible member which passes through holes or the like formed in the shoes and is at intervals connected with the hood material at points adjacent to the edges thereof.

This substantially non-extensible member may also be secured by means of loops of flexible material or otherwise to the semi-flexible members connecting the shoes so as to permit a limited degree of relative motion between the substantially non-extensible member in question and the semi-flexible members connecting the shoes.

Thus at certain points adjacent to the edge of the hood material, the substantially non-flexible members passing through the holes in the shoes and the semi-flexible members connecting the shoes are joined together by loops of flexible material or otherwise.

This last-mentioned substantially non-extensible member is so arranged that in drawing forward the hood so as to cover the vehicle the member in question will operate to draw or guide the edge of the hood so that it is adjacent to or approximately over the channel the said edge is designed to enter.

The material of the hood at certain points adjacent to the shoes may conveniently be connected to the shoes by loops of flexible material or otherwise to prevent the edges of the hood material fouling the shoes.

The substantially non-extensible members may be connected to tensioning means, such for instance as devices including straining screws, and the semi-flexible members may, if desired, be associated with tensioning means.

Another feature of the invention consists in connecting the semi-flexible members with the hood sticks through an extensible connecting means, such for instance as a metallic spring.

The connection of the members in question to the hood sticks in this manner operates in the direction of securing rigidity in the hood when the vehicle is covered and consequently operates to a certain extent in preventing rattle and assists in forming and positioning the loops or bows previously mentioned when the shoes are drawn together in closing the hood.

The shoes employed are conveniently arranged to engage one side of the cant rail through the intermediary of rollers provided with grooves in which a flange on the cant rail will be engaged.

The provision of rollers for securing the engagement of the shoe with the opposite side of the cant rail would appear to be unnecessary and usually such rollers are omitted.

A still further feature of the invention consists in the provision of means adapted to guide or direct the edges of the hood material towards the grooves or channels formed in or associated with the cant rails adapted to accommodate them as the hood material is drawn over the curved portion of the cant rails.

Thus, in accordance with the invention, on the cant rails at the curved portions thereof outwardly projecting flanges at an inclination with the median plane of the cant rail may be formed. Such flanges may extend in an outward direction for a distance of about one inch.

As will be understood, in raising the hood and particularly in the initial stages of the operation, the hood material being more or less contracted, the edges of the same will extend outwardly beyond the cant rails. As the distance between the hood sticks increases the projection will be diminished and as, in view of the construction of the hood, the hood sticks are caused to move apart in raising the hood from the point at which they commence to travel over the curved portion of the cant rails, the outwardly extending flange will force such projecting portions of the edges of the hood material into alignment with the cant rails.

Preferably all of the features above referred to are employed together in constructing the hood but in certain cases the omission of some of the features may not be open to objection.

The invention will be further described with reference to the accompanying drawings, in which :—

Figure 1 is an elevation partly in section,

Figure 2 is a plan view and

Figure 3 is a view in perspective of a cant rail with its associated shoes, the links and hood sticks being omitted, for the purpose of illustrating more clearly certain features of the invention, while Figure 4 is a view in elevation of a cant rail with its associated shoes, and the links connecting the same with the hood stick;

Figure 5 is a view in section of the rear portion of the cant rail as shown in Figure 4 illustrating the functioning of a flange provided thereon.

Figure 3:
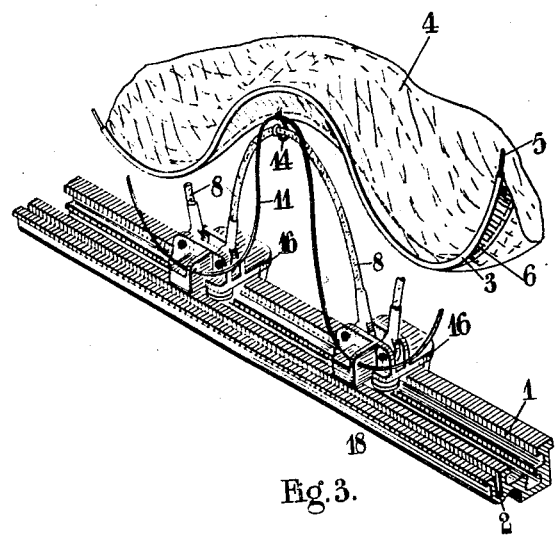

Referring to Figures 1, 3, 4 and 5, 1 is the cant rail in which is provided a groove or channel 2 adapted to engage the edge 3 of the hood material indicated by the reference 4. In the edge of the hood material is located a substantially non-extensible wire or cable 5 which may be of the character of the internal element of a Bowden brake mechanism, the wire being engaged in a hem 6 on the edge of the hood material and being secured therein in a manner similar to that in which piping is secured. The end of the non-extensible member located on one side of the hood is connected to some convenient portion of the body, preferably while the opposite end of the wire or cable is secured to the peak or flap of the hood, in such manner that when the peak is drawn forward in erecting the hood the cable will force the edge of the hood material into the channel.

Figure 6:
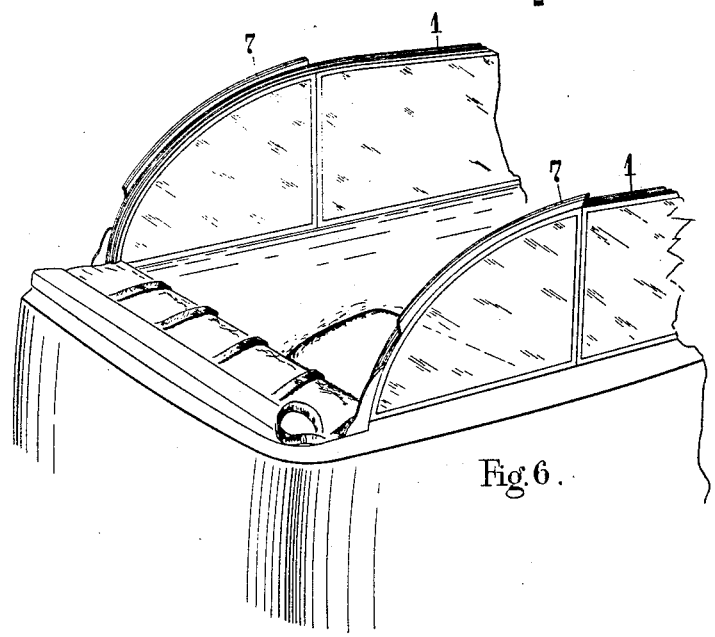
Figure 6 is a perspective view of the rear portion of a vehicle body comprising cant rails constructed as illustrated with reference to Figures 4 and 5.

As illustrated in Figures 4, 5 and 6, a portion of the cant rail is provided with a flange 7 extending in an outward direction. This flanged portion is, as Figure 6 illustrates, only provided on the curved portion of the cant rail at the rear of the vehicle and it is adapted to guide or direct the edges of the hood material toward the groove or channel 2 provided therein in the manner indicated in Figure 5 in which 3″, 3′ and 3 indicate successive positions which portions of the edge of the hood material will assume in the operation of raising the hood.

As shown in Figures 2, 3 and 4 the shoes are connected together by lengths of semi-flexible material 8 which as the hood is lowered curve outward and thus force the edges of the hood material out of the channels in the cant rails during the operation of lowering the hood. These members may be formed of light steel cable and they may be enclosed in sleeving formed, for instance, of lengths of rubber tubing. They are preferably connected as indicated in Figures 1, 2 and 4 with the hood sticks 9 by means of springs 10.

In addition, a substantially non-extensible member which may be a piece of wire cable 11 is connected at intervals with the hood material adjacent to its edge, as indicated at 12 in Figure 4, and threaded through holes 13 in the shoes. For effecting the connection between these non-extensible members and the hood material lengths of twine or the like 14 may be employed, the twine being connected not only to the hood material and the adjacent non-extensible member 11 but also to the adjacent semi-flexible member 8.

In the constructions illustrated the hood sticks are connected by links 15 with the shoes 16. These shoes, as shown in Figures 1, 3 and 4, are provided with a downward extending flange 17 engaging against a flange on the cant rail and as shown in Figures 1 and 3 the opposite edge of the flange is engaged by rollers 18 mounted on pivots provided on the shoes.

As shown in Figure 4 the hood material may be secured to the shoes by loops of flexible material 20 in order to prevent the same fouling the shoes.

Instead of employing semi-flexible members such as 8 connecting one shoe associated with a hood stick with one of the shoes associated with an adjacent hood stick jointed links may be provided for effecting the same result as the flexible members. Thus for instance a link may be pivotally connected with each of the shoes, the adjacent links being connected in pairs at their ends remote from the shoes.

Having now described my invention, what I claim as new and desire to secure by Letters Patent is:—

1. A hood for automobiles and other vehicles of the kind comprising cant rails secured to the body of the vehicle and extending from the front to the rear thereof, a plurality of hood sticks, shoes connected with said hood sticks and engaged with and slidable along said cant rails, a flexible covering associated with the hood sticks, endless flexible members connected to the hood sticks for use in raising and lowering the hood, grooves in the cant rails, means for assisting the engagement of the edge of the flexible covering in said grooves in raising the hood and means connecting the shoes associated with one hood stick to the shoes associated with an adjacent hood stick adapted to force, when lowering the hood, the flexible covering outward from between the hood sticks and assist in disengaging the edges of the flexible covering from the grooves.

2. A hood for automobiles and other vehicles of the kind comprising cant rails secured to the body of the vehicle and extending from the front to the rear thereof, a plurality of hood sticks, shoes engaged with and slidable along said cant rails, a pair of links connecting each end of each of said hood sticks with a pair of shoes, a flexible covering associated with the hood sticks, endless flexible members connected to the hood sticks for use in raising and lowering the hood, grooves in the cant rails and means for assisting the engagement of the edge of the flexible covering in said grooves in raising the hood and a semiflexible member connecting each shoe associated with a hood stick with the shoe associated with an adjacent hood stick adapted to displace the flexible covering from between the links when lowering the hood and assist in disengaging the edges of the flexible covering from the grooves.

3. A hood for automobiles and other vehicles of the kind comprising cant rails secured to the body of the vehicle and extending above and from the front towards the rear thereof and having each a curved portion extending downwards to the rear of the body, a plurality of hood sticks engaged with and slidable along said cant rails, a flexible covering associated with the hood sticks, endless flexible members connected to the hood sticks for use in raising and lowering the hood, grooves in the cant rails, and on the curved portion of each of the cant rails an outwardly directed flange at an inclination with the median plane of the cant rail adapted to assist in engaging the edges of the flexible covering in the grooves in the cant rails.

In testimony whereof I have signed my name to this specification.

FELIX JOHN LEATHER.